United States Patent
Sumita (10) Patent No.: US 8,635,070 B2
(45) Date of Patent: Jan. 21, 2014

(54) SPEECH TRANSLATION APPARATUS, METHOD AND PROGRAM THAT GENERATES INSERTION SENTENCE EXPLAINING RECOGNIZED EMOTION TYPES

(75) Inventor: Kazuo Sumita, Yokohama (JP)

(73) Assignee: Kabushiki Kaisha Toshiba, Minato-ku, Tokyo (JP)

(*) Notice: Subject to any disclaimer, the term of this patent is extended or adjusted under 35 U.S.C. 154(b) by 378 days.

(21) Appl. No.: 13/071,549

(22) Filed: Mar. 25, 2011

(65) Prior Publication Data

US 2012/0078607 A1   Mar. 29, 2012

(30) Foreign Application Priority Data

Sep. 29, 2010   (JP) ................... 2010-219778

(51) Int. Cl.
- G06F 17/28 (2006.01)
- G10L 13/00 (2006.01)
- G10L 13/08 (2013.01)

(52) U.S. Cl.
USPC .............................. 704/258; 704/2; 704/260

(58) Field of Classification Search
USPC ............................................. 704/2, 258, 260
See application file for complete search history.

(56) References Cited

U.S. PATENT DOCUMENTS

| | | | |
|---|---|---|---|
| 5,384,701 A * | 1/1995 | Stentiford et al. | 704/3 |
| 5,815,196 A * | 9/1998 | Alshawi | 348/14.12 |
| 5,860,064 A * | 1/1999 | Henton | 704/260 |
| 6,161,082 A * | 12/2000 | Goldberg et al. | 704/3 |
| 6,243,679 B1 * | 6/2001 | Mohri et al. | 704/256.8 |
| 6,278,968 B1 * | 8/2001 | Franz et al. | 704/3 |
| 6,418,434 B1 * | 7/2002 | Johnson et al. | 1/1 |
| 6,847,931 B2 * | 1/2005 | Addison et al. | 704/260 |
| 6,859,778 B1 * | 2/2005 | Bakis et al. | 704/277 |
| 6,963,839 B1 * | 11/2005 | Ostermann et al. | 704/260 |
| 7,222,075 B2 * | 5/2007 | Petrushin | 704/270 |
| 7,251,606 B2 * | 7/2007 | Horinaka et al. | 704/272 |

(Continued)

FOREIGN PATENT DOCUMENTS

| | | |
|---|---|---|
| JP | 11-119791 | 4/1999 |
| JP | 2008-243043 | 10/2008 |

OTHER PUBLICATIONS

Neubig, et al., "*A WFST-based Log-linear Framcework for Speaking-style Transformation*"; IInterspeech 2009, pp. 1495-1498.

Matsumoto, et al., "*Emotion Estimation Algorithm based on Emotion Occurrence Sentence Pattern*", vol. 14, No. 3, Apr. 2007, pp. 239-271 (with Statement of Relevance).

Primary Examiner — Eric Yen
(74) Attorney, Agent, or Firm — Ohlandt, Greeley, Ruggiero & Perle, L.L.P.

(57) ABSTRACT

According to one embodiment, a speech translation apparatus includes a receiving unit, a first recognition unit, a second recognition unit, a first generation unit, a translation unit, a second generation unit, a synthesis unit. The receiving unit is configured to receive a speech in a first language and convert to speech signal. The first recognition unit is configured to perform speech recognition and generate a transcription. The second recognition unit is configured to recognize which emotion type is included in the speech and generate emotion identification information including recognized emotion type(s). The first generation unit is configured to generate a filtered sentence. The translation unit is configured to generate a translation of the filtered sentence in the first language in a second language. The second generation unit is configured to generate an insertion sentence. The synthesis unit is configured to convert the filtered and the insertion sentences into speech signal.

12 Claims, 9 Drawing Sheets

(56) References Cited

U.S. PATENT DOCUMENTS

| | | | |
|---|---|---|---|
| 7,962,345 B2* | 6/2011 | Liqin et al. | 704/277 |
| 8,032,356 B2* | 10/2011 | Narayanan et al. | 704/2 |
| 8,170,872 B2* | 5/2012 | Lyle | 704/235 |
| 8,175,244 B1* | 5/2012 | Frankel | 379/202.01 |
| 2003/0028383 A1* | 2/2003 | Guerin et al. | 704/275 |
| 2004/0111272 A1* | 6/2004 | Gao et al. | 704/277 |
| 2010/0121629 A1* | 5/2010 | Cohen | 704/2 |
| 2011/0046943 A1* | 2/2011 | Lee et al. | 704/9 |
| 2011/0112821 A1* | 5/2011 | Basso et al. | 704/2 |

* cited by examiner

SPEECH TRANSLATION APPARATUS, METHOD AND PROGRAM THAT GENERATES INSERTION SENTENCE EXPLAINING RECOGNIZED EMOTION TYPES

CROSS-REFERENCE TO RELATED APPLICATIONS

This application is based upon and claims the benefit of priority from Japanese Patent Application No. 2010-219778, filed Sep. 29, 2010; the entire contents of which are incorporated herein by reference.

FIELD

Embodiments described herein relate generally to a speech translation apparatus, method and program.

BACKGROUND

Speech translation machines have been developed to facilitate communication between people of different languages. In order to audio-translate speech in a source language to a target language, the speech translation machine recognizes speech, translates a transcription of the speech acquired by the speech recognition, and converts the translated transcription into synthesized speech sounds of the target language. When people communicate, emotions (e.g., anger, sorrow, or joy) are usually included in a speaker's utterance in accordance with situations the speaker is experiencing as he or she speaks. The speaker's emotion can be conveyed to the listener by translating the emotion as well as the speech.

However, for smooth communication it is not always desirable to reflect the speaker's emotion in synthesized speech. For example, if the speaker's angry mood of the speech is conveyed to the listener through synthesized speech, it may cause an emotional collision between the speaker and the listener.

DETAILED DESCRIPTION

In general, according to one embodiment, a speech translation apparatus includes a receiving unit, a first recognition unit, a second recognition unit, a first generation unit, a translation unit, a second generation unit, a synthesis unit. The receiving unit is configured to receive a speech in a first language and convert the speech to a speech signal. The first recognition unit is configured to perform a speech recognition of the speech signals and generate a transcription of the speech signal, the transcription including one or more raw words or one or more raw phrases in the first language, the raw words and the raw phrases being affected by an speaker's emotion. The second recognition unit is configured to recognize which emotion type is included in the speech using at least one of the transcription and the speech signal and to generate emotion identification information item including at least one recognized emotion type. The first generation unit is configured to generate a filtered sentence by transforming the one or more raw words or the one or more raw phrases into one or more filtered words or one or more phrases in the first language, referring to a first model that the raw words and the phrases correspond to the filtered words and the phrases, the filtered words and the phrases failing to be affected by the emotion. The translation unit is configured to generate a translation of the filtered sentence in the first language into a second language which is different from the first language. The second generation unit is configured to generate an insertion sentence explaining the recognized emotion type in the second language. The synthesis unit is configured to convert the filtered sentence and the insertion sentence into a speech signal.

In the following, the speech translation apparatus, method and program according to the present embodiment will be described in details with reference to the drawings. In the embodiment described below, the same reference numerals will be used to denote similar-operation elements, and a repetitive description of such elements will be omitted.

Herein, in the present embodiment, raw words and phrases are defined as words and phrases affected by emotions. They are uninhibited and spontaneous. Filtered words and phrases are defined as words and phrases are in transcript style and not affected by emotions. Raw vocabulary has a filtered equivalent in most cases. A sentence in which raw words and phrases included in the sentence are transformed to transcript-style words and phrases is defined as a filtered sentence.

Figure 1:
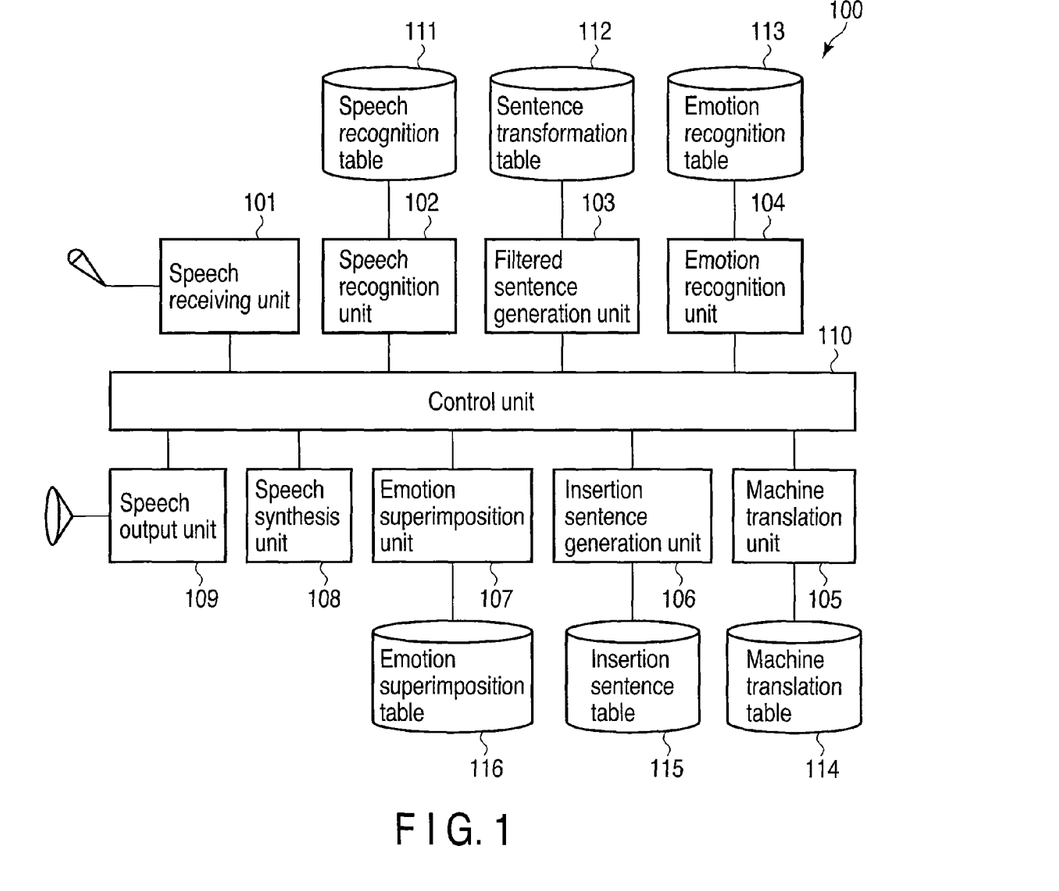
FIG. 1 is a block diagram of the speech translation apparatus according to the present embodiment.

A speech translation apparatus according to the present embodiment is described below with reference to the block diagram of FIG. 1.

The speech translation apparatus 100 according to the present embodiment includes a speech receiving unit 101 (hereinafter, also referred to as an "receiving unit"), a speech recognition unit 102, a filtered sentence generation unit 103, an emotion recognition unit 104, a machine translation unit 105 (hereinafter, also referred to as a "translation unit"), an insertion sentence generation unit 106, an emotion superimposition unit 107 (hereinafter, also referred to as a "superimposition unit") a speech synthesis unit 108, a speech output unit 109, a control unit 110, a speech recognition table 111, a sentence transformation table 112, an emotion recognition table 113, a machine translation table 114, an insertion sentence table 115, and an emotion superimposition table 116.

The speech receiving unit 101 receives spontaneous speech in a language (a first language) from an audio input device, such as a microphone, and converts the spontaneous speech into speech signals.

The speech recognition unit 102 receives the speech signals from the speech receiving unit 101 and generates a transcription corresponding to the speech signals referring to the speech recognition table 111, which will be described later.

The filtered sentence generation unit 103 receives the transcription from the speech recognition unit 102 and generates a filtered sentence by transforming the raw words and phrases in the transcription into filtered words and phrases referring to the sentence transformation table 112 which will be described later. Raw and filtered words and phrases, and the filtered sentence will be described in detail later with reference to FIG. 4.

The emotion recognition unit 104 receives the speech signals from the speech receiving unit 101 and the transcription from the speech recognition unit 102. Referring to the emotion recognition table 113 which will be described later and using at least either one of the speech signals or the transcription, the emotion recognition unit 104 recognizes emotion types included in the speech and generates emotion identification information item including at least one recognized emotion type. The emotion types are anger, sorrow, joy and astonishment, for example. The detail of the emotion recognition unit 104 will be described later with reference to FIG. 6.

The machine translation unit 105 receives a filtered sentence from the filtered sentence generation unit 103 and translates the filtered sentence in the first language recognized by the speech recognition unit 102 to a different language (i.e., a second language), referring to the machine translation table 114.

If the insertion sentence generation unit 106 receives an instruction signal from the control unit 110 which will be described later, it receives the emotion identification information item from the emotion recognition unit 104 and generates an insertion sentence corresponding to the emotion identification information item, referring to the insertion sentence table 115 which will be described later. The details of the insertion sentence generation unit 106 will be described later with reference to FIG. 9.

If the emotion superimposition unit 107 receives an instruction signal from the control unit 110, it receives the translation from the machine translation unit 105 and the emotion identification information item from the emotion recognition unit 104, and generates an emotion-superimposed translation of the filtered sentence referring to the emotion superimposition table 116, which will be described later. In the emotion-superimposed translation, filtered words and phrases in the second language is transformed to raw words and phrases in the second language in accordance with the emotion identification information item. The details of the emotion superimposition unit 107 will be described later with reference to FIG. 10.

The speech synthesis unit 108 receives the translation from the machine translation unit 105, the insertion sentence from the insertion sentence unit 106, and the emotion-superimposed translation from the emotion superimposition unit 107 to generate speech signals for each of those texts.

The speech output unit 109 receives the speech signals from the speech synthesis unit 108 and converts the speech signals into speech sounds to output.

The control unit 110 controls the entire operation at the speech translation apparatus 100. For example, in accordance with the emotion identification information item the control unit 110 chooses which text is to be output from the apparatus as speech sound from the following: the emotion-superimposed translation, the insertion sentence to be added to a translation, or both the emotion-superimposed translation and the insertion sentence which is to be added to the emotion-superimposed translation. In accordance with the choice, the control unit 110 sends the insertion sentence generation unit 106 an instruction signal to generate an insertion sentence, and sends the emotion superimposition unit 107 an instruction signal to generate an emotion-superimposed translation.

As a method of selecting text to be output from the apparatus, the control unit 110 controls the apparatus to generate the emotion-superimposed translation when the emotion identification information item indicates a positive emotion type, and when the emotion identification information item indicates a negative emotion type, to generate an insertion sentence.

The speech recognition table 111 stores a word table and a language model in the first language. The speech recognition table is referred to at the process of speech recognition.

The sentence transformation table 112 stores a filler table, a translation model, and a language model in the first language. The sentence transformation table 112 is referred to in order to generate a filtered sentence.

The emotion identifying table 113 stores a speech sound table and a text table in the first language, and it is referred to at the process of emotion recognition.

The machine translation table 114 stores a translation model for translation from the first language to the second language and a language model in the second language. The machine translation table 114 is referred to at the process of translation.

The insertion sentence table 115 stores emotion types and explanations of the emotions corresponding to the emotion type in the second language. The insertion sentence table 115 is referred to at the process of insertion sentence generation.

The emotion superimposition table 116 stores a filler table, a translation model and a language model in the second language. The emotion superimposition table 116 is referred to at the process of emotion superimposition.

Figure 2:
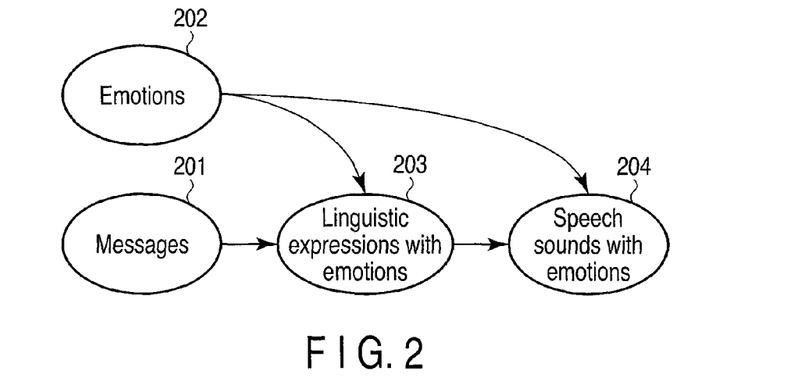
FIG. 2 is a conceptual diagram of a speaker's speech model of speaker's affective utterance.

Next, a model of speaker's speech related to utterance with emotions is explained with reference to FIG. 2.

A message 201 that the speaker is trying to convey is transformed to an emotionally-affected linguistic expression 203 by an influence of the speaker's emotion 202 as the emotion 202 is superimposed on the message 201. The emotion 202 is also superimposed on the linguistic expression 203, and then the message 201 is produced as a speech 204 containing vocal features (e.g., speech volume) that reflect the emotion 202, that is, a raw sentence. Signals that can be obtained by the speech receiving unit 101 and the sound recognition unit 102 are speeches 204 influenced by the speaker's emotions. Thus, the message 201 and the emotion 202 that the speaker wants to convey need to be conjectured from the speech 204.

Next, the detail of the speech recognition unit 102 is explained with reference to FIG. 3. In the following explanation, the first language is Japanese and the second language is English.

The speech recognition unit 102 includes a feature extraction unit 301, an acoustic model calculation unit 302, and a decoder 303. The speech recognition table 111 includes a vocabulary table 304 and a language model 305.

The feature extraction unit 301 receives speech signals from the speech receiving unit 101 and extracts features of the speech signals, such as a Mel frequency cepstrum coefficient.

The acoustic model calculation unit 302 receives the features from the feature extraction unit 301 and calculates an acoustic model for a word that may be contained in the speech signals referring to the vocabulary table 304.

The decoder 303 receives the acoustic model from the acoustic model calculation unit 302, and generates a word sequence as a result of the speech recognition, based on a language model which is the closest to the acoustic model.

The vocabulary table 304 stores data of Japanese words that is obtained by analyzing speech data collected beforehand. The data consists of Japanese notation of a word, phoneme of the word, and a probability that indicates a similarity between the phonemes of the word and features, and these elements are related to each other. For example, data such as "ううん uun (probability 1)," "そんな sonna (probability 2)" are stored in the vocabulary table 304.

The language model 305 stores information item that word sequences and probabilities indicating a frequency of the word sequence are related to each other for raw sentence containing raw words and phrases. For example, information items such as "uun/sonna/koto (probability 5)" and "sonna/koto/ari (probability 6)" are stored in the language model.

Generally, the process of recognizing an utterance of an arbitrary sentence is called large vocabulary continuous speech recognition. The process can be formulated into an equation as shown below which calculates a word sequence V that maximizes a conditional probability P(X|V), where a speech signal sequence X is an input. In other words, the process of large vocabulary continuous speech recognition is to apply the following equation 1:

$$\hat{W} = \underset{W}{\mathrm{argmax}} P(W \mid V).  \qquad \text{(Equation 1)}$$

Herein, W in equation (1) represents a word sequence V, and V in equation (1) represents a speech signal sequence X. Equation (1) can be transformed as shown below, using Bayes' theorem. Equation (2) represents a noisy channel model.

$$\hat{W} = \underset{W}{\mathrm{argmax}} [P(V \mid W) \cdot P(W)]  \qquad \text{(Equation 2)}$$

By this transformation, it can be understood that applying equation (1) is equal to determining a word sequence V that maximizes P(X|V)P(V), where the speech signal sequence X is an input. Accordingly, for the large vocabulary continuous speech recognition, an existing algorithm can be used as algorithm which determines the word sequence V by applying equation (2).

Figure 3:
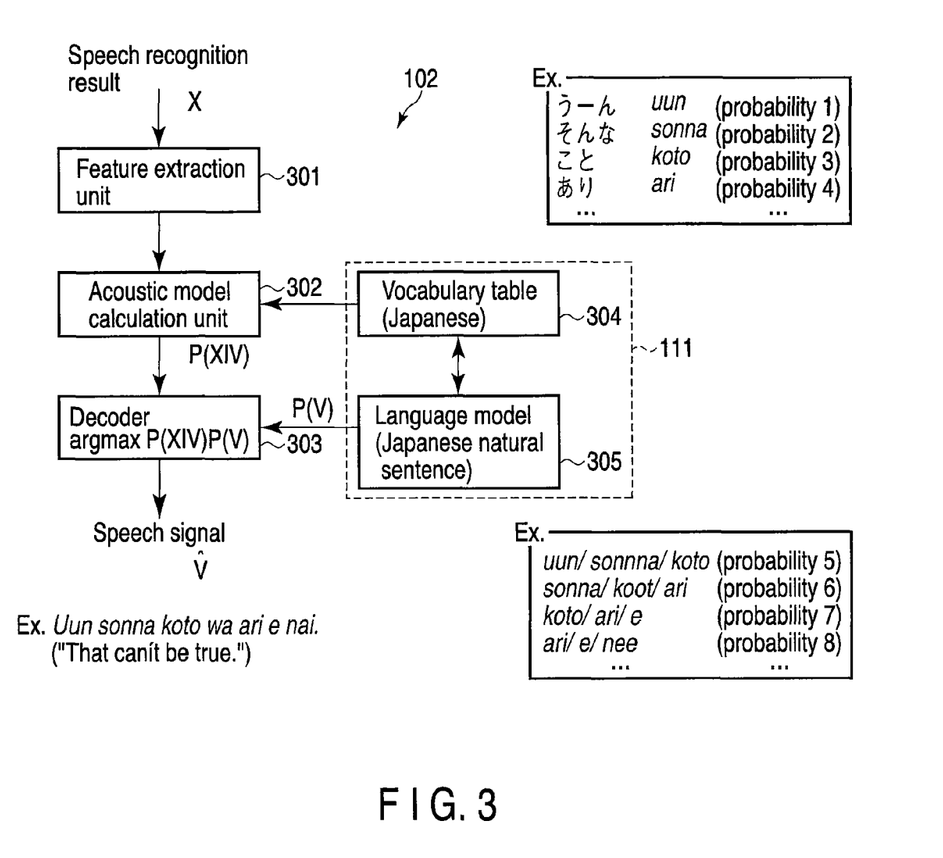
FIG. 3 is a block diagram of the speech recognition unit according to the present embodiment.

In FIG. 3, the acoustic model which is calculated at the acoustic model calculation unit 302 is indicated by P(X|V), which is a conditional probability of the speech signal sequence X for the word sequence V. On the other hand, the language model is indicated as P(V), which is a probability of appearance of the word sequence V. The decoder 303 executes a process to search a word sequence V that maximizes the probability P(X|V)P(V). As P(X|V) and P(V) are stored in a form of data, it is possible to search for the word sequence V that maximizes P(X|V)P(V) by applying equation (2) for all possible combinations of words for a word sequences V. However, since it is an exhaustive way to determine a most likely word sequence V from all possible combinations, it is desirable to combine other procedures, such as the Viterbi algorithm which is a type of linear programming and beam search algorithm which narrows all combinations down to more likely combinations to execute search.

Figure 4:
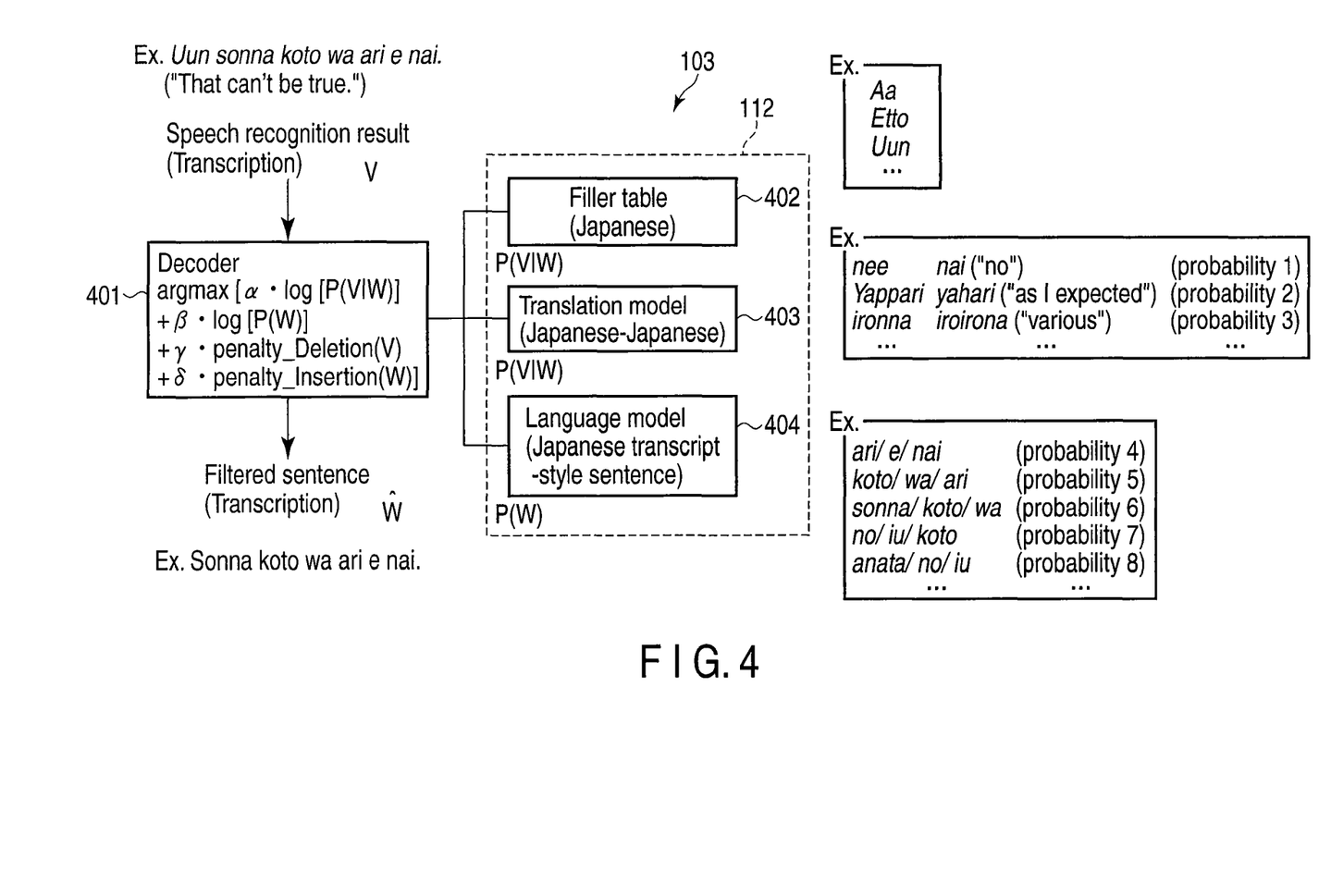
FIG. 4 is a block diagram of the filtered sentence generation unit according to the present embodiment.

Next, the details of the filtered sentence generation unit 103 will be explained with reference to FIG. 4.

The filtered sentence generation unit 103 includes a decoder 401. The sentence transformation table 112 includes a filler table 402, a translation model 403 and a language model 404.

The decoder 401 receives a transcription resulted from speech recognition from the speech recognition unit 102, and then, generates a filtered sentence referring to the filler table 402, the translation model 403 and the language model 404.

The filler table 402 stores fillers in Japanese. Fillers are conjunctional words or conversational phrases which are used interjectionally, and they are often not meaningful. For examples, "aa," "eetto," and "uun" are common fillers in Japanese.

The translation model 403 stores raw sentences and filtered sentences that correspond to the raw sentences in a corpus. In the model, the words in the raw sentences correspond to the words in the filtered sentences (alignment). In the example shown in FIG. 4, the raw words and phrases, the corresponding filtered words and phrases, and a probability indicating similarity between the raw and filtered words and phrases are stored. Sets of raw word or phrase and a filtered word or phrase corresponding to the raw word or phrase are stored along with a probability, for example, [nee (a colloquial form of "no"), nai ("no") (probability 1)], [yappari (a colloquial form of "as I expected") yahari ("as I expected") (probability 2)].

The language model 404 stores occurrence probabilities of word sequences based on the corpus in which filtered sentences are collected. For example, "ari/e/nai (probability 4)," "koto/wa/ari (probability 5)" are stored in the model.

A model for transforming an acquired raw sentence to a filtered sentence can be formulated using the noisy channel model which is widely used in statistical translation. More specifically, when a raw sentence V is observed, a most-likely filtered sentence W corresponding to the observed raw sentence is calculated. This procedure can be formulated to equation (1) to estimate W which maximizes P(V|W). As applying equation (1) is equivalent to estimating W that satisfies equation (2) according to the Bayes' theorem, P(V|W) represents the translation model 403 for translating a raw sentence to a filtered sentence, and P(W) represents the language model 404 for filtered sentences.

There is a procedure to improve accuracy of the noisy channel model which is represented by equation (2), using a logarithm linear model as expressed by the following equation (3) (refer to Graham Neubig, et al., A WFST-based Log-linear Framework for Speaking-style Transformation, Proc INTERSPEECH 2009, pp. 1495-1498).

$$\hat{W} = \underset{W}{\mathrm{argmax}} [\alpha \cdot \log(P(V \mid W)) + \beta \cdot \log(P(W))]  \qquad \text{(Equation 3)}$$

In the noisy channel model, the translation model P(V|W) and the language model P(W) are calculated with the same weight; in contrast, in the logarithm linear model, different weights can be respectively set for those models. Furthermore, a most likely W can be determined by using other terms, as shown in the following equation (4).

$$\hat{W} = \underset{W}{\operatorname{argmax}}[\alpha \cdot f_1(V, W) + \beta \cdot f_2(V, W) + \gamma \cdot f_3(V, W) + \ldots] \quad \text{(Equation 4)}$$

The value $f_n$ (V, W) (n is a integer number) does not have to be a probability; rather, a continuous value, such as penalty which is used when a regular word or a filler is inserted or deleted, can be used as terms. Also, as to weights $\alpha$, $\beta$, $\gamma$, etc., a combination of weights should be predetermined based on learning data so as to achieve the best accuracy.

Figure 5:
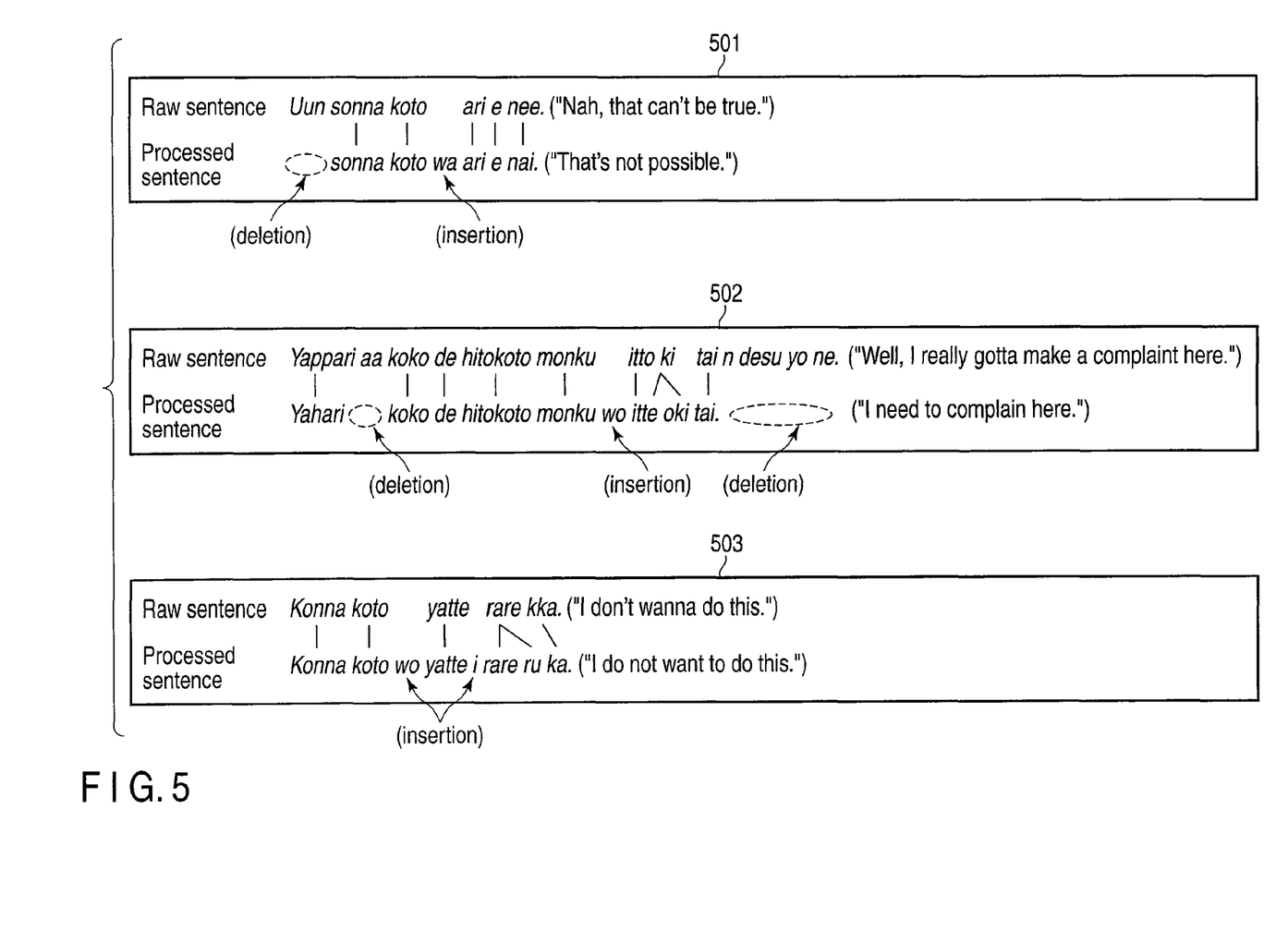
FIG. 5 is a block diagram illustrating an example of an alignment of a raw sentence with a filtered sentence used for the filtered transcript-style sentence generation process.

Next, the process of generating a filtered sentence at the filtered sentence generation unit 103 will be explained with reference to FIG. 5.

The decoder 401 of the filtered sentence generation unit 103 transforms the raw sentence in an alignment 501, for example, "uun sonna koto ari e nee ("Nah, that can't be true")" to a filtered sentence, using the translation model 403. More specifically, the filler "uun" is deleted, a particle is inserted, and the colloquial form "nee" is substituted with the transcript-style form "nai." As a result, the filtered sentence corresponding to the above raw sentence "sonna koto wa ari e nai ("That's not possible")" is generated from the decoder 401.

Figure 6:
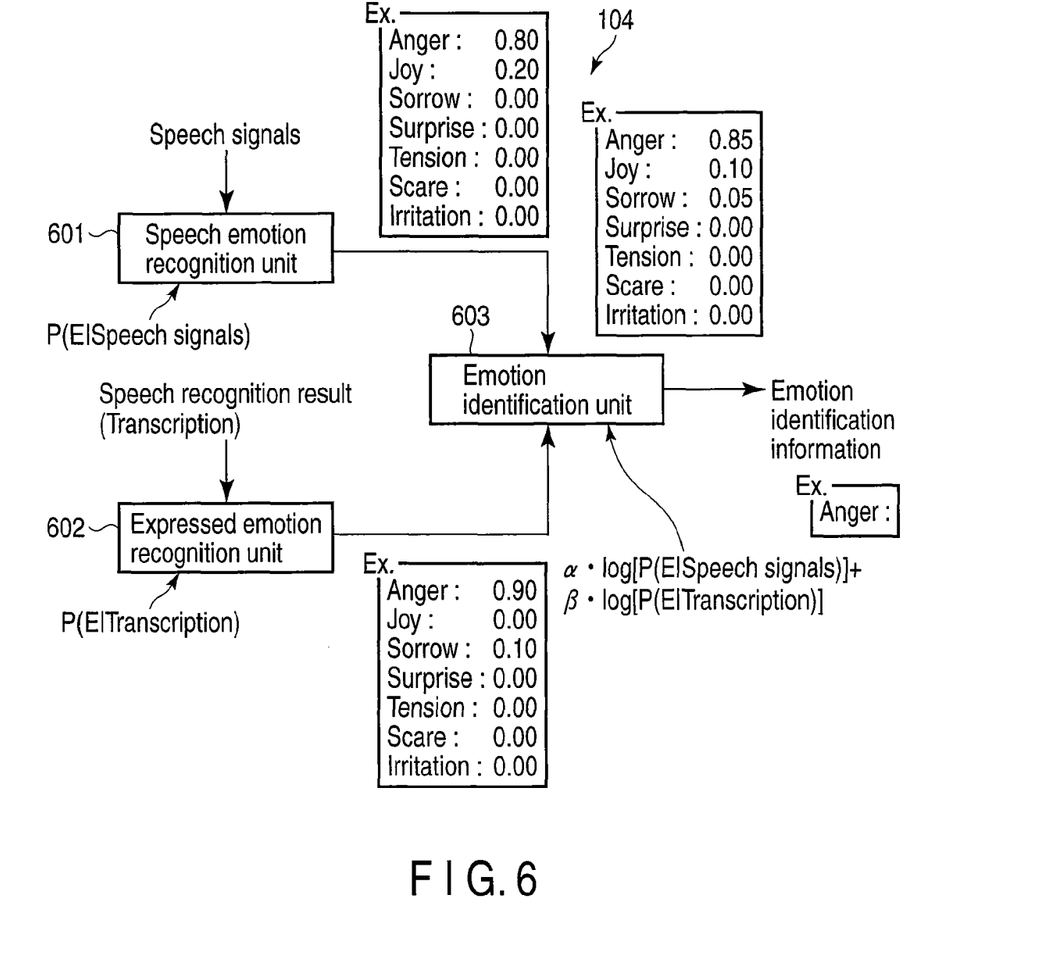
FIG. 6 is a block diagram of the emotion recognition unit according to the present embodiment.

Next, the details of the emotion recognition unit 104 will be explained with reference to FIG. 6.

The emotion recognition unit 104 includes a speech emotion recognition unit 601, an expressed emotion recognition unit 602, and an emotion identification unit 603.

The speech emotion recognition unit 601 receives speech signals from the speech receiving unit 101 and a probability model of the speech signals (P (E|speech signal)) from the emotion recognition table 113. The speech emotion recognition unit 601 identifies an emotion type based on a signal strength of the speech signals and a basic frequency pattern ($F_0$ pattern) to generate speech emotion candidates. For example, if emotion of excitement, such as anger and joy, is expressed in the speech, a basic frequency of the speech signal tends to be high and a power of the speech signal tends to be large; in contrast, when a emotion of sadness is expressed, a basic frequency of the speech signal tends to be low and a power of the speech signal tends to be less. Accordingly, emotion types can be recognized using characterizing parameters, such as a difference from an average of basic frequencies, a difference from an average of speech signal, a difference between a basic frequency at each point in speech, such as a start point of speech, an end point of speech, or a middle point of speech, and an average of a basic frequency.

The expressed emotion recognition unit 602 receives the transcription resulted from the speech recognition process from the speech recognition unit 102, and receives a probability model of the transcription (P (E|transcription)) from the emotion recognition table 113, and then, the expressed emotion recognition unit 602 generates expressed emotion candidates by identifying emotion types based on the linguistic expressions used in the transcription, using the emotion recognition table 113. For example, there is a procedure of identification emotions using useful expression patterns stored by emotion types in advance in an emotion recognition table. According to this procedure, the expression patterns useful for emotions identification are stored in the table in advance, and the emotion identification is carried out by determining whether or not an input text has any of the expression patterns in the table. This procedure can be adopted for the present embodiment. (Refer to Kazuyuki Matsumoto et al. "Emotion Estimation Algorithm based on Emotion Occurrence Sentence Pattern". Vol. 14, No. 3, pp. 239-271.)

The emotion identification unit 603 receives a speech emotion candidate from the speech emotion identification unit 601 and an expression emotion candidate from the expressed emotion identification unit 602, and determines arithmetic average of a score of the speech emotion candidate and a score of the expression emotion candidate to generate the emotion identification information item from an emotion with a highest score. For example, as shown in FIG. 6, the score of "anger" is 0.80 and "joy" is 0.20 as the speech emotion candidates, and the score of "anger" is 0.90 and "sorrow" is 0.10 as the expressed emotion candidates. If each of arithmetic averages of the speech emotion candidates and the expressed emotion candidates are calculated, the candidate "anger" has the highest scores of 0.85; accordingly, the emotion type "anger" is acquired as the emotion identification information item.

Note that an emotion type with a highest score does not have to be always selected to obtain the emotion identification information item. The arbitrary numbers of emotion types may be selected in accordance with the scores, or all emotion types may be selected. In the above example, the final score is determined by an arithmetic average; however, either one of two categories of candidates may be weighted to calculate a mean.

Further, in the above example, the emotion identification information item is generated by the arithmetic average of the speech emotion candidates and the expressed emotion candidates. However, either one of the two categories of candidates may be replaced with the emotion identification information item. In that case, the emotion identification unit 603 selects either a speech emotion candidate or an expressed emotion candidate and generates it as the emotion identification information item.

Figure 7:
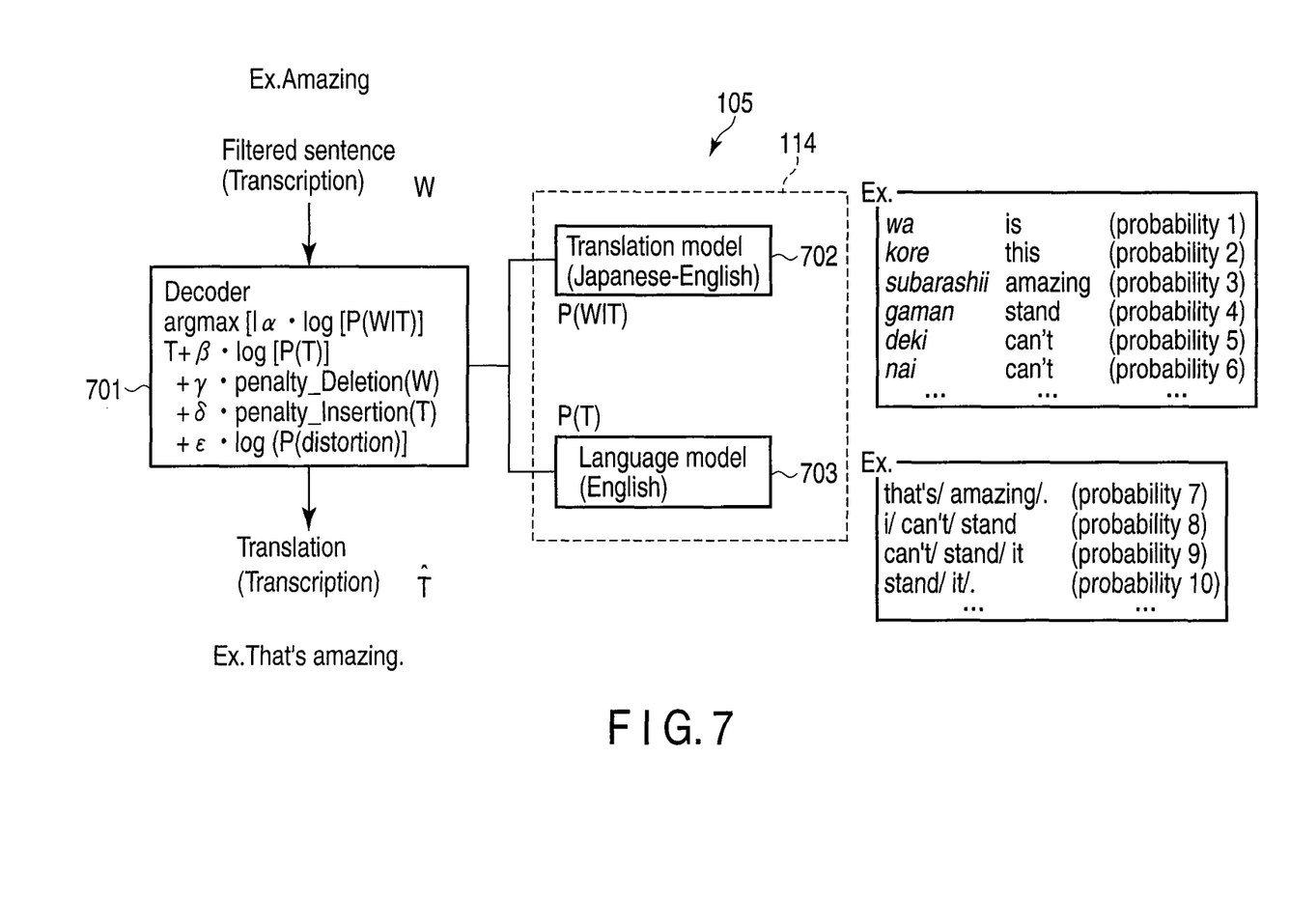
FIG. 7 is a block diagram illustrating the machine translation unit according to the present embodiment.

Next, the operation of the machine translation unit 105 will be explained with reference to FIG. 7.

The machine translation unit 105 includes a decoder 701. The machine translation table 114 includes a translation model 702 and a language model 703.

The decoder 701 receives the transcription of the filtered sentence and generates the translation referring to the translation model 702 and the language model 703.

The translation model 702 stores data of correspondences between Japanese words and English words which are determined in advance based on the alignment data of Japanese sentences and English sentences.

The language model 703 stores data set of occurrence probability of word sequences based on the corpus of English sentences.

A major procedure can be used for the process of machine translation. Specifically, the decoder 701 generates the translation by searching for an English word sequence T that maximizes an arithmetic average of the following: a logarithmic value of probability P of a translation model log [P(W|T)] obtained from the translation model 702, a logarithmic value of probability P of the language model log [P(T)] obtained from the language model 703, a deletion penalty for deleting a Japanese word having no corresponding English word from the source Japanese sentence, an insertion penalty to insert an English word having no corresponding Japanese word in the Japanese sentence to be translated, and a logarithmic value of an occurrence probability for a distance (distortion) between a position of a Japanese word in the source Japanese sentence and a corresponding English word in the translated sentence.

Figure 8:
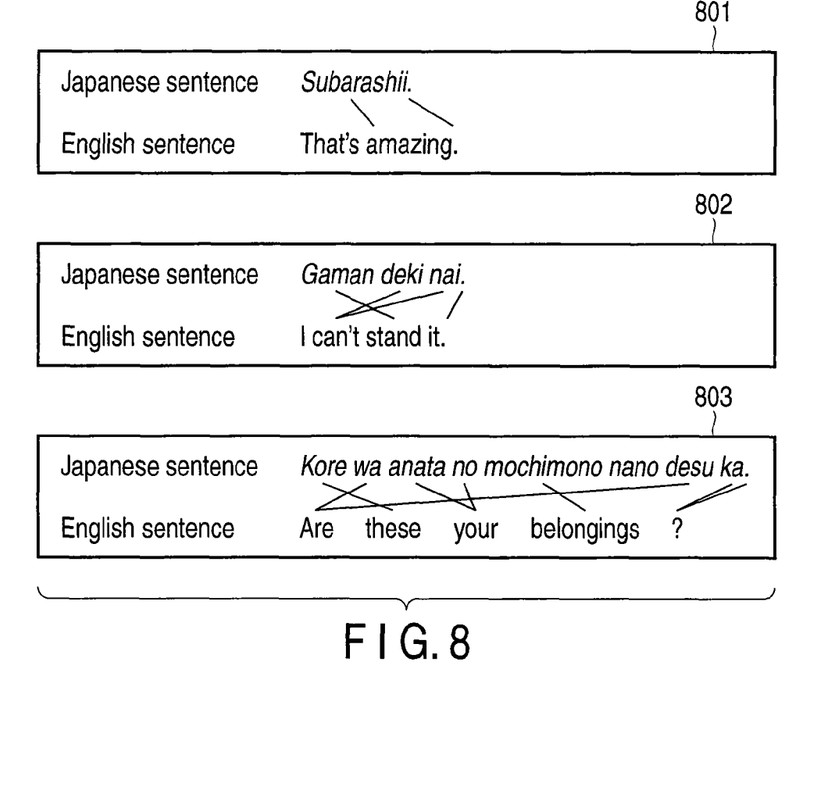
FIG. 8 shows an example of alignment of a Japanese sentence with an English sentence.

Herein, an example of alignment of a Japanese translation and an English translation stored in the translation model 702 will be explained with reference to FIG. 8.

For example, in the alignment 801, the Japanese sentence "subarashii ("amazing")" is translated as "That's amazing" in English. Herein, "that's" is inserted when translating the Japanese sentence into the English sentence. In a similar manner, "I" and "it" are translated when translating the Japanese sentence "Gaman ("stand") dekinai ("cannot")" as "I can't stand it" in English, in the alignment 802.

Figure 9:
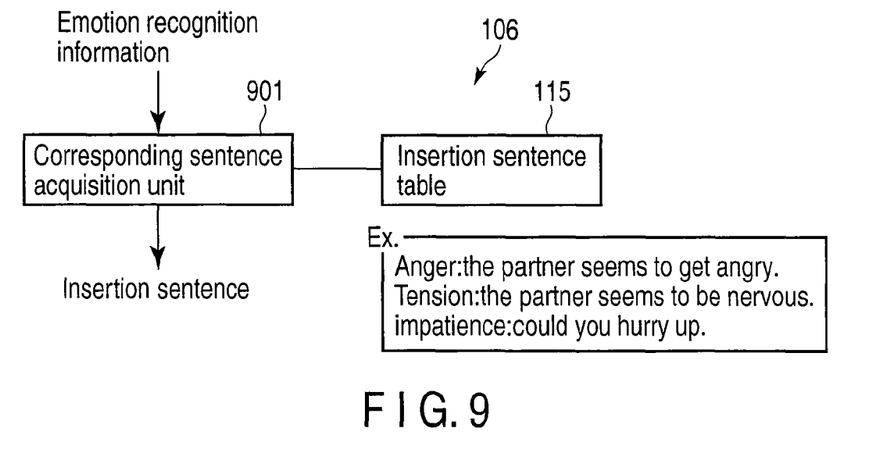
FIG. 9 is a block diagram illustrating the insertion sentence generating unit according to the present embodiment.

Next, the insertion sentence generation unit 106 will be explained in detail with reference to FIG. 9.

The insertion sentence generation unit 106 includes a corresponding sentence acquisition unit 901.

The corresponding sentence acquisition unit 901 receives the emotion identification information item from the emotion recognition unit 104 in accordance with the instruction from the control unit 110, and acquires an explanatory sentence corresponding to the emotion identification information item from the insertion sentence table 115 to generate an insertion sentence. For example, in the insertion sentence table 115, the emotion type "anger" corresponds to the explanatory sentence "The partner seems to get angry.", the emotion type "impatience" corresponds to the explanatory sentence "Could you hurry up?". By acquiring these kind of explanatory sentences corresponding to emotion types, an insertion sentence can be generated from the translation in order to add data as to with what kind of emotion the speaker holds when he or she speaks.

In the case of presenting emotion types included in the emotion identification information item with the insertion sentence, probabilities of the emotion types may also presented. For example, if the probability of the emotion type "anger" is 0.80, the data "anger 80%" may be indicated with the insertion sentence. When more than one emotion types are included in the emotion identification information item, for example, "anger" and "irritation," "anger 80%, irritation 15%" may be indicated. By indicating probabilities, speaker's delicate expression of emotions can be presented accurately.

Figure 10:
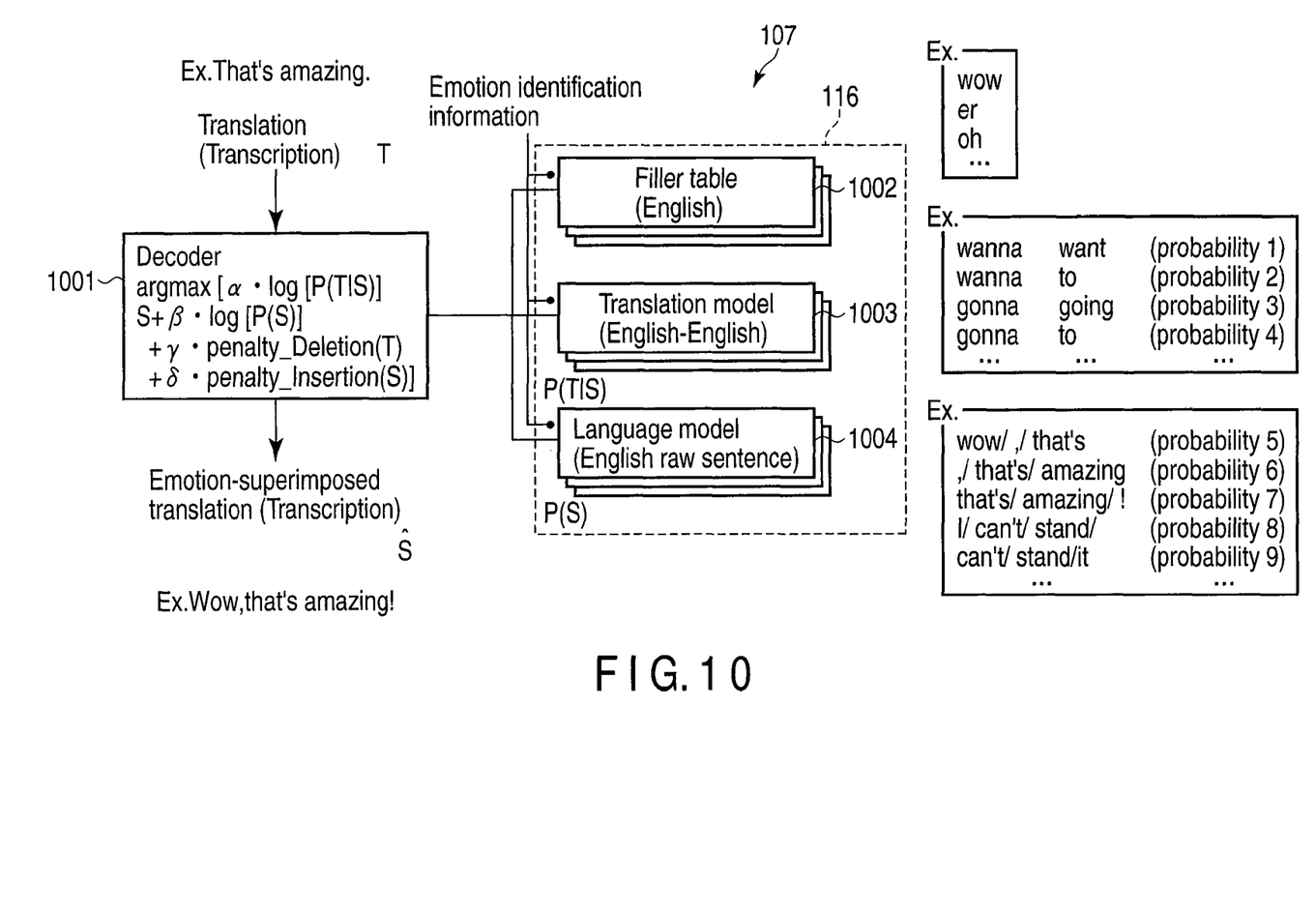
FIG. 10 is a block diagram illustrating the emotion superimposition unit according to the present embodiment.

Next, the operation of the emotion superimposition unit 107 will be explained with reference to FIG. 10.

The emotion superimposition unit 107 includes a decoder 1001. The emotion superimposition table 116 includes a filler table 1002, a translation model 1003 and a language model 1004.

The filler table 1002 stores English fillers by emotion types.

The translation model 1003 calculates alignment data between corresponding words based on a bilingual corpus of raw sentences and filtered sentences by emotion types, and stores the alignment data by emotion types.

The language model 1004 has a corpus storing English raw sentences by emotion types and stores occurrence probabilities of word sequences by emotion types.

The decoder 1001 receives the translation from the machine translation unit 105, and searches for a word sequence S from combination candidates so as to convert the translation to the emotion-superimposed translation based on the filler table 1002, the translation model 1003 and the language model 1004, in accordance with the instruction from the control unit 110. More specifically, the decoder 1001 generates the emotion-superimposed translation by searching for a word sequence S that maximizes an arithmetic average of the following: a logarithmic value of probability of the translation model log [P(T|S)] acquired from the translation model 1003, a logarithmic value of probability of the language model log [P(S)] acquired from the language model 1004, a deletion penalty for deleting a word in a raw sentence to be generated not having a corresponding word in the filtered sentence, an insertion penalty for inserting a word in a raw sentence when there is no corresponding word in a filtered sentence.

As an example, suppose if the translated sentence "That's amazing." is input to the decoder 1001 and the emotion identification information item indicates the emotion type "surprise," the filler "wow" which indicates an emotion of surprise is chosen from the filler table 1002, and the sentence "That's amazing!" is selected in accordance with the occurrence probability of English raw sentences stored in the language model 1004, and then, the translated sentence "That's amazing." is converted to "Wow, that's amazing!".

Figure 11:
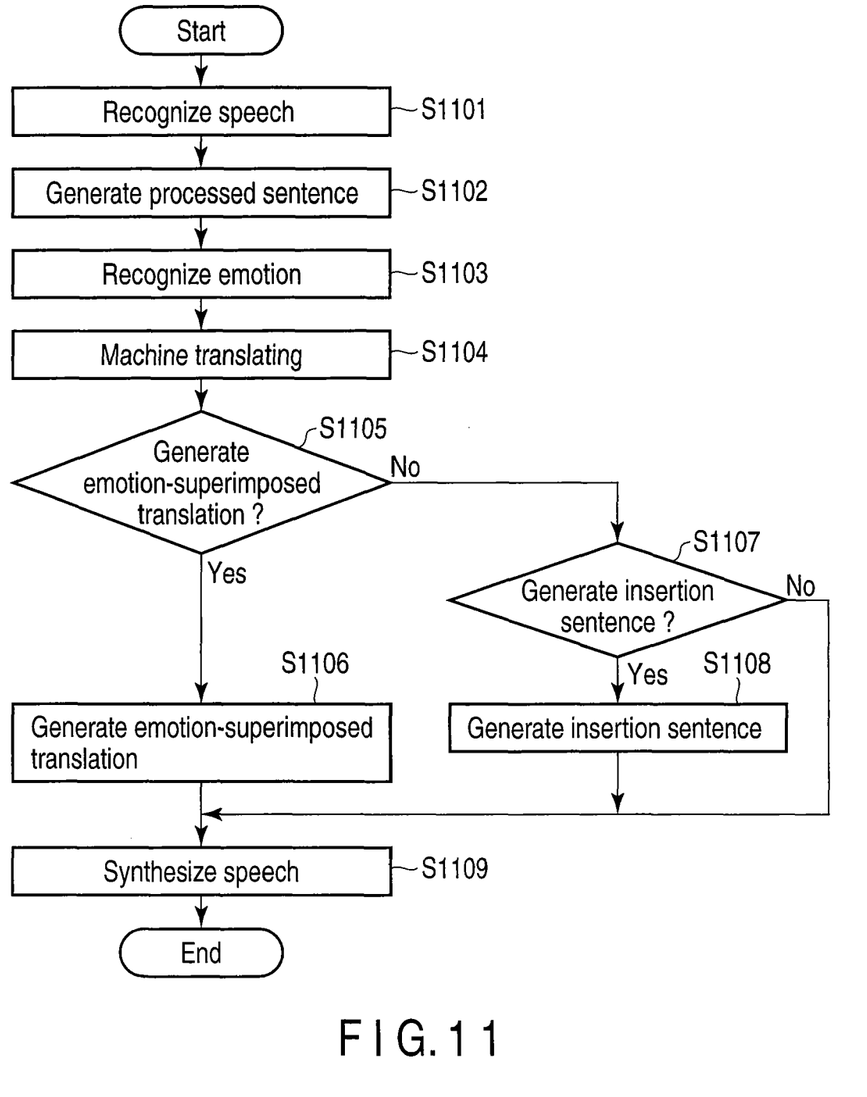
FIG. 11 is a flowchart illustrating the operation of the speech translation apparatus according to the present embodiment.

Next, the operation of the speech translation apparatus according to the present embodiment is explained with reference to the flowchart of FIG. 11.

In step S1101, the speech recognition unit 102 performs speech recognition on the input speech to obtain the transcription.

In step S1102, the filtered sentence generation unit 103 performs the process of filtered sentence generation on the transcription obtained as a result of the speech recognition to generate the filtered sentence.

In step S1103, the emotion recognition unit 104 generates the emotion identification information item based on the speech signals and the transcription obtained as a result of the speech recognition.

In step S1104, the machine translation unit 105 machine-translates the filtered sentence to acquire the translation.

In step S1105, the control unit 110 determines whether the emotion-superimposed translation should be generated or not. In terms of smooth communication, it is preferable that the determination should be made so as to reflect positive emotions, such as joy and surprise, in the filtered translation. Accordingly, if the emotion identification information item indicates a positive emotion type, the control unit 110 determines to generate the emotion-superimposed translation. When doing so, the operation proceeds to step S1106. When not generating, the operation proceeds to step S1107.

In step S1106, the emotion superimposition unit 107 generates the emotion-superimposed translation.

In step S1107, the control unit 110 determines whether the insertion sentence should be generated or not. In terms of smooth communication, if negative emotion types, such as "anger" or "irritation" are included in the emotion identification information item, it is preferable that the determination should be made so as not to reflect any emotion in the translation of the filtered sentence. Accordingly, when the emotion identification information item indicates negative emotion types, the control unit 101 determines to generate the insertion sentence. When the insertion sentence is generated, the operation proceeds to step S1108. When the insertion sentence is not generated, the operation proceeds to step S1109.

In step S1108, the insertion sentence generation unit 106 generates the insertion sentence from the explanatory sentence corresponding to the emotion type according to the emotion identification information item.

In step S1109, the speech synthesis unit 108 carries out speech synthesis on the emotion-superimposed translation if any available, or carries out speech synthesis on a sentence to which the insertion sentence, if any available, is incorporated.

Not shown, the control unit 110 may be configured to generate both of the emotion-superimposed translation and the insertion sentence when both positive and negative emotion types are included in the emotion identification information item. For example, suppose if the negative emotion type "anger" and the positive emotion type "joy" are included in the emotion identification information item, if the emotion-superimposed translation is the only transcription that is output as speech sound, a translation on which joy is superimposed will be presented to the listener; on the other hand, if a listener can recognize the emotion of anger in the speech sound with the aid of an insertion sentence, the speaker's subtle emotions can be conveyed to the listener; thus, smooth communication can be achieved. In this case, the control unit 110 may be controlled so as to add the insertion sentence to the emotion-superimposed translation. The speech synthesis unit 108 synthesizes speech sounds for the emotion-superimposed translation to which the insertion sentence is added.

According to the present embodiment, the insertion sentence generation unit 106 generates an insertion sentence in accordance with an instruction signal from the control unit 110, and the emotion superimposition unit 107 generates an emotion-superimposed translation. However, the embodiment does not have to be limited to this operation; rather, an insertion sentence and an emotion-superimposed translation may be generated for all transcriptions resulted from the speech recognition process, regardless of the instructions from the control unit 110.

According to the present embodiment described above, smooth communication between people of different languages can be achieved by presenting a translation without any emotional expressions, presenting a translation on which a speaker's emotion is superimposed, or presenting a translation with supplemental information indicating a speaker's emotion to convey emotions that the speaker want to express.

The flow charts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech translation apparatus comprising:
a computer or other programmable apparatus programmed to cause:
a receiving unit to receive a speech in a first language and convert the speech to a speech signal;
a first recognition unit to perform a speech recognition of the speech signal and generate a transcription of the speech signal, the transcription including one or more raw words or one or more raw phrases in the first language, the raw words and the raw phrases being affected by an speaker's emotion;
a second recognition unit to recognize which emotion type is included in the speech using at least one of the transcription and the speech signal and to generate emotion identification information item including at least one recognized emotion type;
a first generation unit to generate a filtered sentence by transforming the one or more raw words or the one or more raw phrases into one or more filtered words or one or more filtered phrases in the first language by referring to a first model that corresponds the raw words and the raw phrases to the filtered words and the filtered phrases, the filtered words and the filtered phrases failing to be affected by the speaker's emotion;
a translation unit to generate a translation of the filtered sentence in the first language into a second language which is different from the first language;
a second generation unit to generate an insertion sentence explaining the recognized emotion type in the second language; and
a synthesis unit to convert the filtered sentence and the insertion sentence into a speech signal.

2. The apparatus according to claim 1, wherein the computer or other programmable apparatus is further programmed to cause a superimposition unit to generate an emotion-superimposed translation in which one or more filtered words or one or more filtered phrases in the second language included in the translation is transformed to one or more raw words or one or more filtered phrases in the second language in accordance with the emotion identification information item, referring to fillers for the emotion type and a second model in which the raw words and the raw phrases in the second language and corresponding the filtered words and the filtered phrases are stored by the emotion type,
wherein the synthesis unit converts the emotion-superimposed translation into a speech signal.

3. The apparatus according to claim 2, wherein the computer or other programmable apparatus is further programmed to cause a control unit to select generating the emotion-superimposed translation, generating the insertion sentence and adding the insertion sentence to the translation, or generating the emotion-superimposed translation and the insertion sentence and adding the insertion sentence to the emotion-superimposed translation in accordance with the emotion identification information item.

4. The apparatus according to claim 3, wherein the control unit controls to generate the emotion-superimposed translation when the emotion identification information item indicate a positive emotion type, and to generate the insertion sentence and add the insertion sentence to the translation when the emotion identification information item indicates a negative emotion type.

5. The apparatus according to claim 3, wherein the control unit adds the insertion sentence to the emotion-superimposed translation when both the positive emotion type and the negative emotion type are included in the emotion identification information item.

6. The apparatus according to claim 1, wherein the emotion identification information item is correspondences between the emotion type and probability.

7. The apparatus according to claim 1, wherein the computer or other programmable apparatus is further programmed so that the second recognition unit causes:
   a speech emotion recognition unit to identify the emotion type of the transcription and generate one or more speech emotion candidates based on at least one identified emotion type, using a signal strength of the speech signal and a difference between the basic frequencies of the speech signal, and
   an emotion identification unit to generate the speech emotion candidates as the emotion identification information item.

8. The apparatus according to claim 1, wherein the computer or other programmable apparatus is further programmed so that the second recognition unit causes:
   an expressed emotion identification unit to identify the emotion type of the transcription and generate one or more expressed emotion candidates based on at least one identified emotion type, using words and phrases in the transcription and sentence-end forms in the transcription; and
   an emotion identification unit to generate the expressed emotion candidates as the emotion identification information item.

9. The apparatus according to claim 1, wherein the computer or other programmable apparatus is further programmed to cause a sentence transformation table to store the first model.

10. The apparatus according to claim 1, wherein the computer or other programmable apparatus is further programmed to cause a insertion sentence table configured to store at least one emotion type and at least one explanation of the emotion corresponding to the emotion type in the second language,
   wherein the second generation unit generates the insertion sentence based on the insertion sentence table.

11. A speech translation method comprising:
   receiving, by a computer or other programmable apparatus, a speech in a first language and converting the speech to a speech signal;
   performing, by the computer or other programmable apparatus, a speech recognition of the speech signal and generating a transcription of the speech signal, the transcription including one or more raw words or one or more raw phrases in the first language, the raw words and the raw phrases being affected by an speaker's emotion;
   recognizing, by the computer or other programmable apparatus, which emotion type is included in the speech using at least one of the transcription and speech signal and generating emotion identification information item including at least one recognized emotion type;
   generating, by the computer or other programmable apparatus, a filtered sentence by transforming the one or more raw words or the one or more raw phrases into one or more filtered words or one or more filtered phrases in the first language by referring to a first model that corresponds the raw words and the raw phrases to the filtered words and the filtered phrases, the filtered words and the filtered phrases failing to be affected by the speaker's emotion;
   generating, by the computer or other programmable apparatus, a translation of the filtered sentence in the first language into a second language which is different from the first language;
   generating, by the computer or other programmable apparatus, an insertion sentence explaining the recognized emotion type in the second language; and
   converting, by the computer or other programmable apparatus, the filtered sentence and the insertion sentence into a speech signal.

12. A non-transitory computer readable medium including computer executable instructions, wherein the instructions, when executed by a processor, cause the processor to perform a method comprising:
   receiving a speech in a first language and converting the speech to a speech signal;
   performing a speech recognition of the speech signal and generating a transcription of the speech signal, the transcription including one or more raw words or one or more raw phrases in the first language, the raw words and the raw phrases being affected by an speaker's emotion;
   recognizing which emotion type is included in the speech using at least one of the transcription and speech signal and generating emotion identification information item including at least one recognized emotion type;
   generating a filtered sentence by transforming the one or more raw words or the one or more raw phrases into one or more filtered words or one or more filtered phrases in the first language by referring to a first model that corresponds the raw words and the raw phrases to the filtered words and the filtered phrases, the filtered words and the filtered phrases failing to be affected by the speaker's emotion;
   generating a translation of the filtered sentence in the first language into a second language which is different from the first language;
   generating an insertion sentence explaining the recognized emotion type in the second language; and
   converting the filtered sentence and the insertion sentence into a speech signal.

* * * * *